United States Patent [19]

Nabekura et al.

[11] Patent Number: 5,530,815
[45] Date of Patent: Jun. 25, 1996

[54] APPARATUS AND METHOD FOR VERIFYING THE ORDER AND OPERATION OF A DATA PROCESSING DEVICE WHEN ASYNCHRONOUS COMMANDS ARE HELD IN A COMMAND QUEUE

[75] Inventors: Hideaki Nabekura; Shuntaro Fujioka, both of Kawasaki, Japan

[73] Assignee: Fujitsu Limited, Kawasaki, Japan

[21] Appl. No.: 105,175

[22] Filed: Aug. 12, 1993

[30] Foreign Application Priority Data

Nov. 18, 1992 [JP] Japan .................................. 4-307461

[51] Int. Cl.⁶ .................................................. G06F 9/38
[52] U.S. Cl. .................... 395/375; 364/231.8; 364/263; 364/DIG. 1; 364/28.6; 364/262.4; 364/948.34; 364/948.3
[58] Field of Search .................. 395/375; 371/12; 364/231.8, 232.21, 931.44, 931.03, 228.7, 231.9

[56] References Cited

U.S. PATENT DOCUMENTS

| | | | |
|---|---|---|---|
| 4,783,783 | 11/1988 | Nagai et al. ................... | 371/12 |
| 4,907,147 | 3/1990 | Saito et al. .................... | 364/200 |
| 4,916,652 | 4/1990 | Schwarz et al. ................ | 364/748 |
| 4,924,466 | 5/1990 | Gregor et al. .................. | 371/12 |
| 4,982,402 | 1/1991 | Beaven et al. .................. | 371/12 |
| 5,067,069 | 11/1991 | Fite et al. ..................... | 395/375 |
| 5,073,855 | 12/1991 | Staplin et al. .................. | 395/375 |
| 5,109,381 | 4/1992 | Duxbury et al. ................ | 371/16.5 |
| 5,109,514 | 4/1992 | Garner et al. .................. | 395/125 |
| 5,119,495 | 6/1992 | King ............................. | 395/700 |
| 5,301,331 | 4/1994 | Veno et al. ..................... | 395/725 |

FOREIGN PATENT DOCUMENTS

| | | |
|---|---|---|
| 0405489 | 1/1991 | European Pat. Off. . |
| WO93/01544 | 1/1993 | WIPO . |

OTHER PUBLICATIONS

Iacobovici, A Pipelined Interface For High Floating–Point Performance With Precise Exceptions, IEEE Micro, Jun. 1988, pp. 77–87.

"A Strategy for Avoiding Pipeline Interlock Delays in a Microprocessor," T. Yoshida et al., International Conference on Computer Design, ICCD '90, Sep. 17, 1990, Cambridge, pp. 14–19.

*Primary Examiner*—Kevin A. Kriess
*Assistant Examiner*—Lucien Toplu
*Attorney, Agent, or Firm*—Staas & Halsey

[57] ABSTRACT

Asynchronous computation commands sent from a command control are held in a command queue. The executable command is selected and supplied to a pipelined asynchronous computing unit. A status area is assured for each command held in the command queue and pipeline bits indicative of a progressing state of the execution of the command in the asynchronous computing unit are stored. A queue verifier discriminates the pipeline bits and verifies that a plurality of pipeline stages does not exist in the status area of the same command and that a plurality of pipeline stages does not exist among the commands, thereby guaranteeing the correct order and operation of the execution of the commands.

16 Claims, 10 Drawing Sheets

|  | COMMAND CODE | FIRST SOURCE REGISTER NUMBER | SECOND SOURCE REGISTER NUMBER | RESULT REGISTER NUMBER |
|---|---|---|---|---|
| COMMAND n | 30 | 32 | 34 | 36 |
| ⋮ | | | | |
| COMMAND 2 | | | | |
| COMMAND 1 | | | | |

| | COMMAND CODE 30 | FIRST SOURCE REGISTER NUMBER 32 | SECOND SOURCE REGISTER NUMBER 34 | RESULT REGISTER NUMBER 36 | PIPELINE BITS F E1 E2 W |
|---|---|---|---|---|---|
| COMMAND n | | | | | |
| ... | | | | | |
| COMMAND 4 | | | | | |
| COMMAND 3 | | | | | |
| COMMAND 2 | | | | | |
| COMMAND 1 | | | | | |

| TIME | PIPELINE BIT | | | | RESULT OF CHECK-IN ENTRY |
|---|---|---|---|---|---|
| | F | E1 | E2 | W | |
| $T_0$ | 0 | 0 | 0 | 0 | 1 |
| $T_1$ | 1 | 0 | 0 | 0 | 1 |
| $T_2$ | 0 | 1 | 0 | 0 | 1 |
| $T_3$ | 0 | 0 | 1 | 0 | 1 |
| $T_4$ | 0 | 0 | 0 | 1 | 1 |

FIG. 8

|  | PIPELINE BIT | | | | |
|---|---|---|---|---|---|
| TIME | F | E1 | E2 | W | RESULT OF CHECK-IN ENTRY |
| $T_0$ | 0 | 0 | 0 | 0 | 1 |
| $T_1$ | 1 | 1 | 0 | 0 | 0 ← ERROR |
| $T_2$ | 0 | 1 | 0 | 0 | 1 |
| $T_3$ | 0 | 0 | 1 | 0 | 1 |
| $T_4$ | 0 | 0 | 0 | 1 | 1 |

FIG. 9

| COMMAND NUMBER | PIPELINE BIT | | | |
|---|---|---|---|---|
| | F | E1 | E2 | W |
| 5 | 0 | 0 | 0 | 0 |
| 4 | 1 | 0 | 0 | 0 |
| 3 | 0 | 1 | 0 | 0 |
| 2 | 0 | 0 | 1 | 0 |
| 1 | 0 | 0 | 0 | 1 |
| | 1 | 1 | 1 | 1 |

FIG. 10

| COMMAND NUMBER | PIPELINE BIT | | | |
|---|---|---|---|---|
| | F | E1 | E2 | W |
| 5 | 0 | 0 | 0 | 0 |
| 4 | 1 | 1 | 0 | 0 |
| 3 | 0 | 1 | 0 | 0 |
| 2 | 0 | 0 | 1 | 0 |
| 1 | 0 | 0 | 0 | 1 |
| | 1 | 0 | 1 | 1 |

↑
ERROR

FIG. 11

APPARATUS AND METHOD FOR VERIFYING THE ORDER AND OPERATION OF A DATA PROCESSING DEVICE WHEN ASYNCHRONOUS COMMANDS ARE HELD IN A COMMAND QUEUE

BACKGROUND OF THE INVENTION

The present invention relates to a verifying apparatus of a data processing apparatus for fetching a command held in a command queue and executing and, more particularly, to a verifying method and apparatus of a data processing apparatus for holding a command in a command queue until the execution of the command is normally finished.

In recent years, in association with the realization of a high command executing speed by a CPU, not only is a command (synchronous command) sequentially executed in every machine cycle by a synchronous computing unit, but also a long command (asynchronous command), existing over a plurality of cycles, is executed in parallel with the operation of the CPU by providing an asynchronous computation control unit as another computing unit. A circuit scale of the data processing apparatus, therefore, increases by a size corresponding to only the asynchronous computation control unit. Problems such as failure of an LSI and defective logic operations occur. A necessity to improve the reliability is ever increasing.

Figure 1:
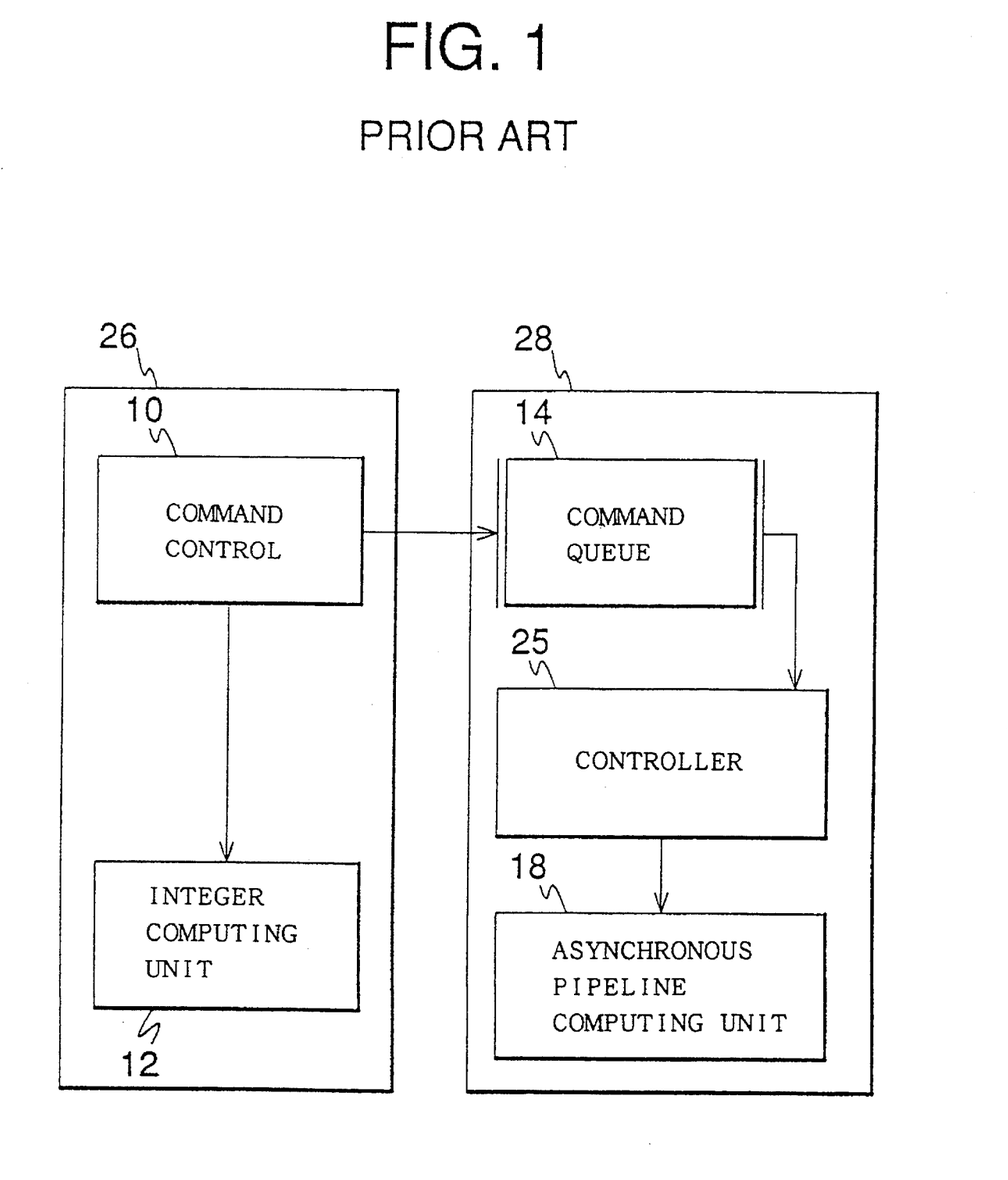
FIG. 1 is an explanatory diagram of a conventional data processing apparatus.
Figure 2:
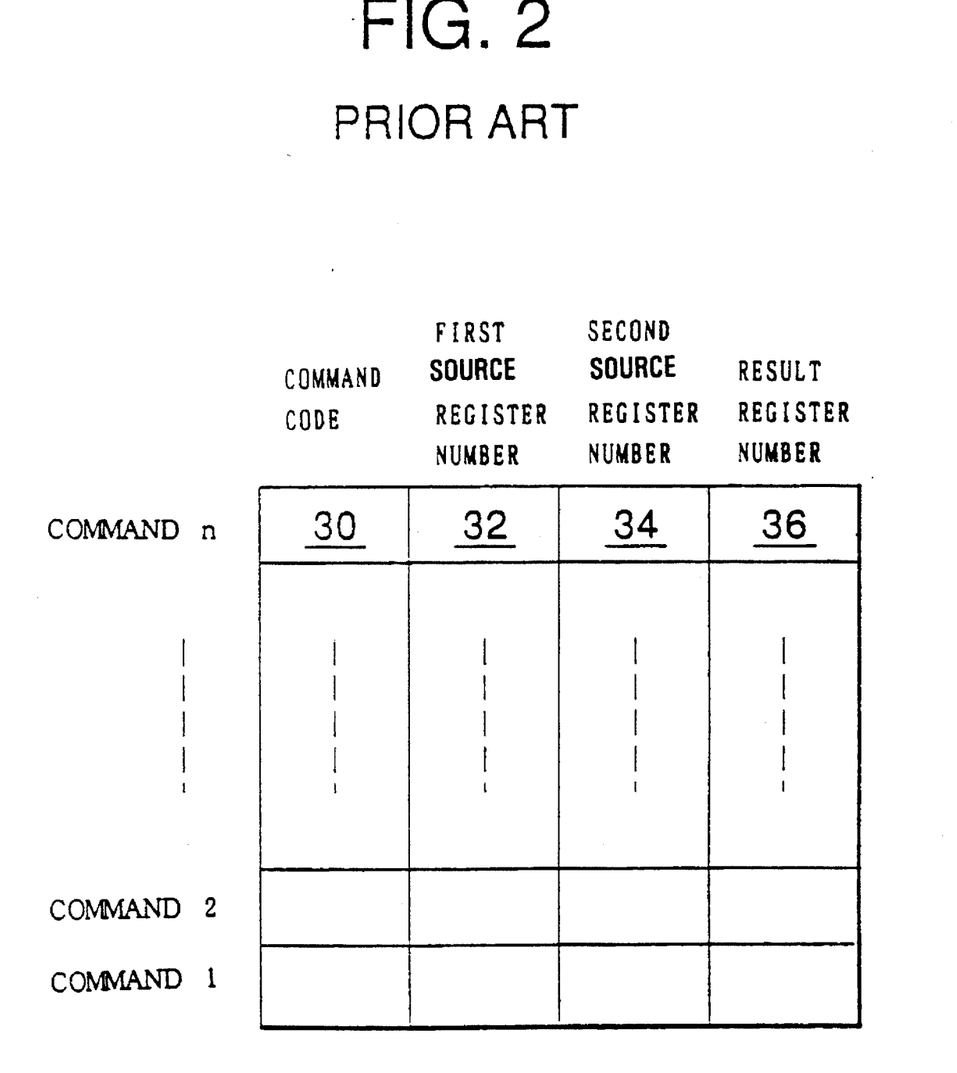
FIG. 2 is an explanatory diagram of a conventional command queue.

FIG. 1 shows a conventional data processing apparatus. An asynchronous computation control unit 28 to execute a long asynchronous command in parallel is provided for a central processing unit (CPU) 26 having an integer computing unit 12 to sequentially execute commands. The command is decoded by a command control 10 provided in the CPU 26. In the case of a synchronous command, it is sent to the synchronous computing unit 12 and is executed. In the case of an asynchronous command, it is sent to the asynchronous computation control unit 28 and is executed. The asynchronous computation control unit 28 comprises: a command queue 14 to hold commands as a queue; a controller 25 to select the command which can be executed from the command queue 14; and an asynchronous pipeline computing unit 18 which functions as an asynchronous computing unit which receives the command selected and supplied from the command queue 14 by the controller 25 and executes the command in a plurality of cycles. As shown in FIG. 2, the command queue 14 is constructed by a command code 30, a first source register number 32, a second source register number 34, and a result register number (destination register number) 36.

When commands are generated from the command control 10 in the CPU 26, a queueing to temporarily hold the commands in the command queue 14 is executed. After completion of the queueing, the command which can be executed is selected by the controller 25 and is fetched from the command queue 14 and is supplied to the asynchronous pipeline computing unit 18. When there is a command preserving request in this instance, the command is held in the command queue 14 until the asynchronous pipeline computing unit 18 correctly finishes the execution of the command. When there is no command preserving request, the command is deleted from the command queue 14.

In case of providing an asynchronous computation control unit in order to realize a high computation processing speed, however, the circuit scale of the data processing apparatus increases by an amount corresponding to such an asynchronous computation control unit, so that a possibility of the occurrence of an LSI failure or defective logic operation is high. That is, when the pipeline control of the asynchronous calculations based on the command queue 14 provided in the asynchronous computation control unit 28 is disturbed by the occurrence of a defective LSI, failure, disconnection of wire, defective logic operation, or the like, the contents of the command queue 14 which holds the commands as a queue cannot be guaranteed. There is consequently a problem such that the data processing apparatus doesn't operate in accordance with the order of the command queue and a contradiction occurs in the execution of the commands and the execution of the commands is abnormally finished.

SUMMARY OF THE INVENTION

According to the invention, there are provided a verifying method and apparatus of a data processing apparatus, in which the order and operation are guaranteed when asynchronous commands held in a command queue are executed.

First, the invention is constructed by a central processing unit (CPU) and an asynchronous computation control unit. The CPU comprises: a command control for sequentially decoding commands in accordance with the order and distinguishing the decoded commands into a synchronous computation command and an asynchronous computation command and sending those commands to different destinations; and an integer computing unit (synchronous computing means) for executing the synchronous computing command sent from the command control. The asynchronous computation control unit comprises: a command queue for holding the asynchronous computing commands sent from the command control and waiting for the execution of the command; a command selector for selecting the command which can be executed from the command queue and for allowing the selected command to be held in the command queue until the completion of the execution of the command; and an asynchronous pipeline computing unit which has been pipelined and executes the asynchronous command selected by the command selector in parallel at a plurality of stages.

According to the invention, further, there are provided: a status monitor for assuring a status area every command stored in the command queue and storing information (pipeline bits) indicative of a progressing status of the execution of the command in the asynchronous pipeline computing unit into the status area; and a queue verifier for verifying the status area. The queue verifier checks status bits (pipeline bits) of the status area every command held in the command queue and verifies that a plurality of pipeline stages does not exist in an entry of the same command, thereby guaranteeing the order and operation when the command is executed. At the same time, the queue verifier checks status bits (pipeline bits) of the status area in portions among a plurality of commands held in the command queue and verifies that a plurality of the same pipeline stages does not exist among the commands, thereby guaranteeing the order and operation of the commands.

According to the verifying method and apparatus of the data processing apparatus of the invention as mentioned above, a status area 20 to store the pipeline bits is newly provided for the command queue 14 of the asynchronous computation control unit, thereby enabling the following conditions to be verified and guaranteeing the order and operation upon execution of commands.

Condition 1:

A plurality of pipeline stages must not exist in the entry of one command in the command queue.

Condition 2:

A plurality of the same pipeline stages must not exist among the commands in the command queue.

Therefore, in the case where a pipeline control of the asynchronous calculations based on the command queue provided in the asynchronous computation control unit is disturbed due to the occurrence of a defective LSI, failure, disconnection of wire, defective logic operation, or the like, two or more pipeline bits are set into the entry of one command or two or more pipeline bits are set into the same stage among a plurality of commands. Therefore, abnormalities of the order and operation in the execution of the commands are immediately recognized and a proper error recovering process is started. By adding command queue pipeline bits and by checking the order and operation in the execution of the commands based on the command queue, accordingly, the contents in the command queue can be guaranteed.

The above and other objects, features, and advantages of the present invention will become more apparent from the following detailed description with reference to the drawings.

DETAILED DESCRIPTION OF THE PREFERRED EMBODIMENT

Figure 3:
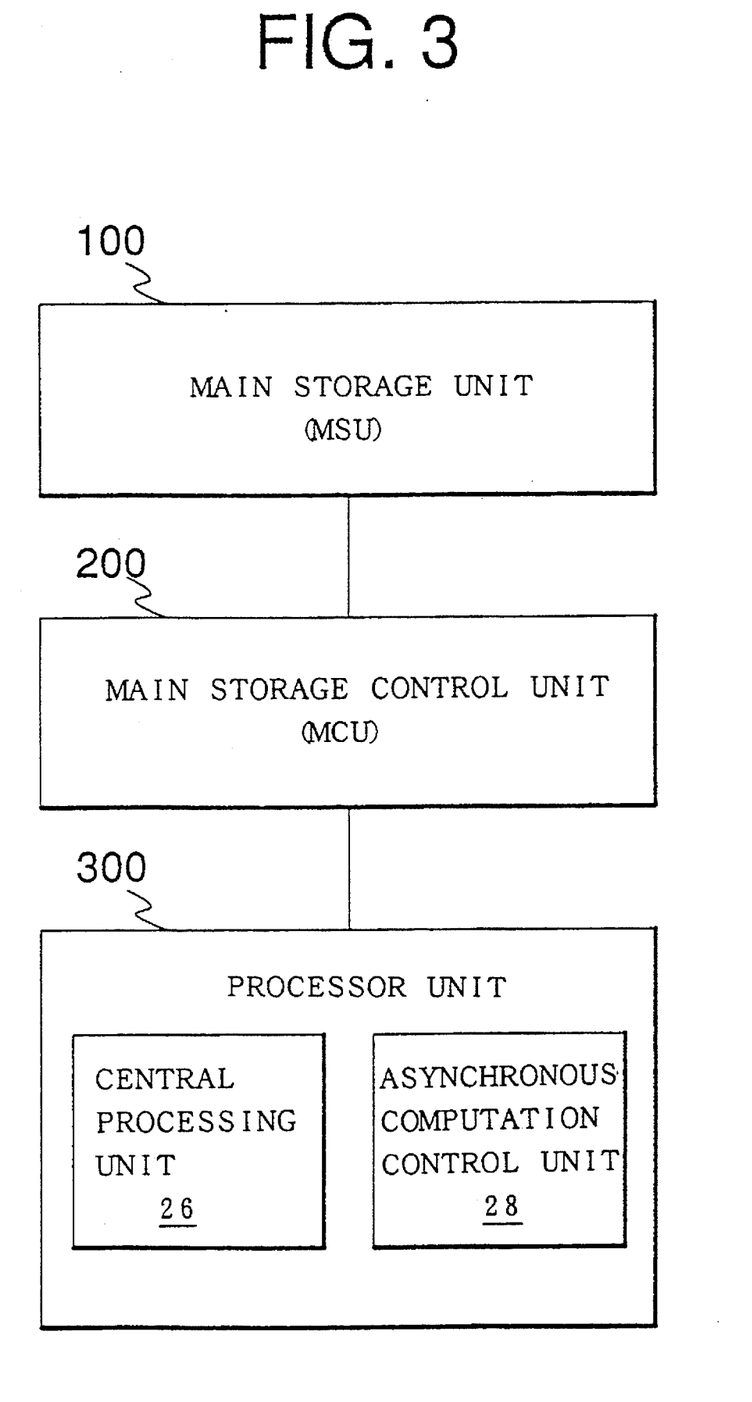
FIG. 3 is a block diagram showing a whole construction of the present invention.

FIG. 3 shows a whole construction of a data processing apparatus according to the present invention. The data processing apparatus comprises a main storage unit (MSU) 100, a main storage control unit (MCU) 200, and the processor unit 300. The processor unit 300 includes the CPU 26 having a function serving as a synchronous computing unit to sequentially execute commands and the asynchronous computation control unit 28 having a pipeline computing unit for asynchronously executing a long command. An information processing apparatus for executing commands in parallel at a high processing speed by the CPU 26 and asynchronous computation control unit 28 as mentioned above is used as a scalar unit of each processor element which is used in a super computer with a parallel machine structure.

Figure 4:
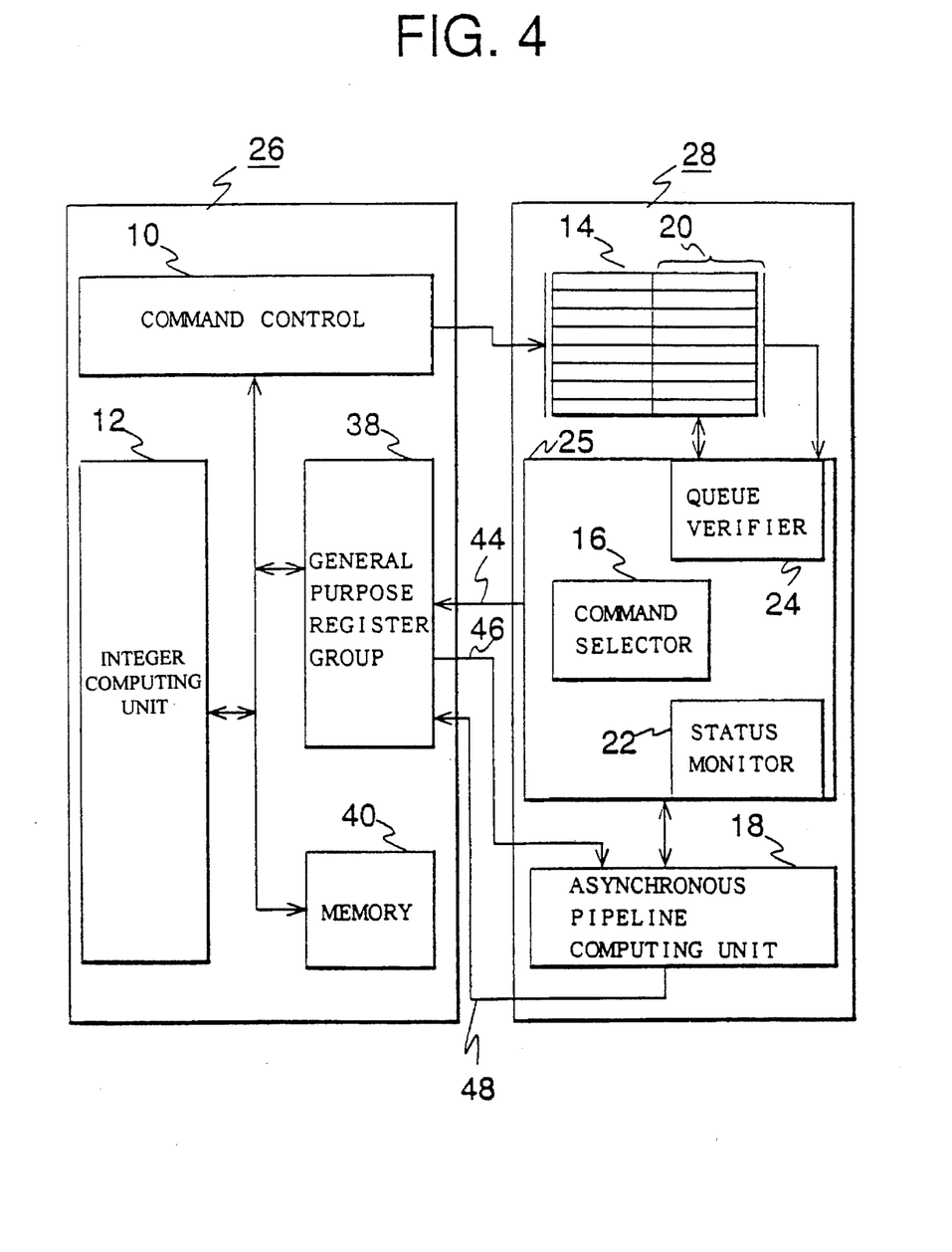
FIG. 4 is a block diagram showing an embodiment of the present invention.

FIG. 4 shows the details of the CPU 26 and asynchronous computation control unit 28 provided in the processor unit 300 in FIG. 3. The CPU 26 comprises: the command control 10; the integer computing unit 12 which functions as a synchronous computing unit; a general purpose register group 38 having various general registers which are used to execute commands; and a memory 40 which is used as a local memory such as a cache memory or the like. The command control 10 sequentially decodes commands and sends a decoded synchronous computing command to the integer computing unit 12, thereby allowing an integer calculation which is finished in one cycle to be executed. When the command control 10 decodes an asynchronous computing command, for example, a floating point computing command, since such a command is a long command which is executed in a plurality of cycles, it is sent to the asynchronous computation control unit 28 and is executed in parallel.

Figure 5:
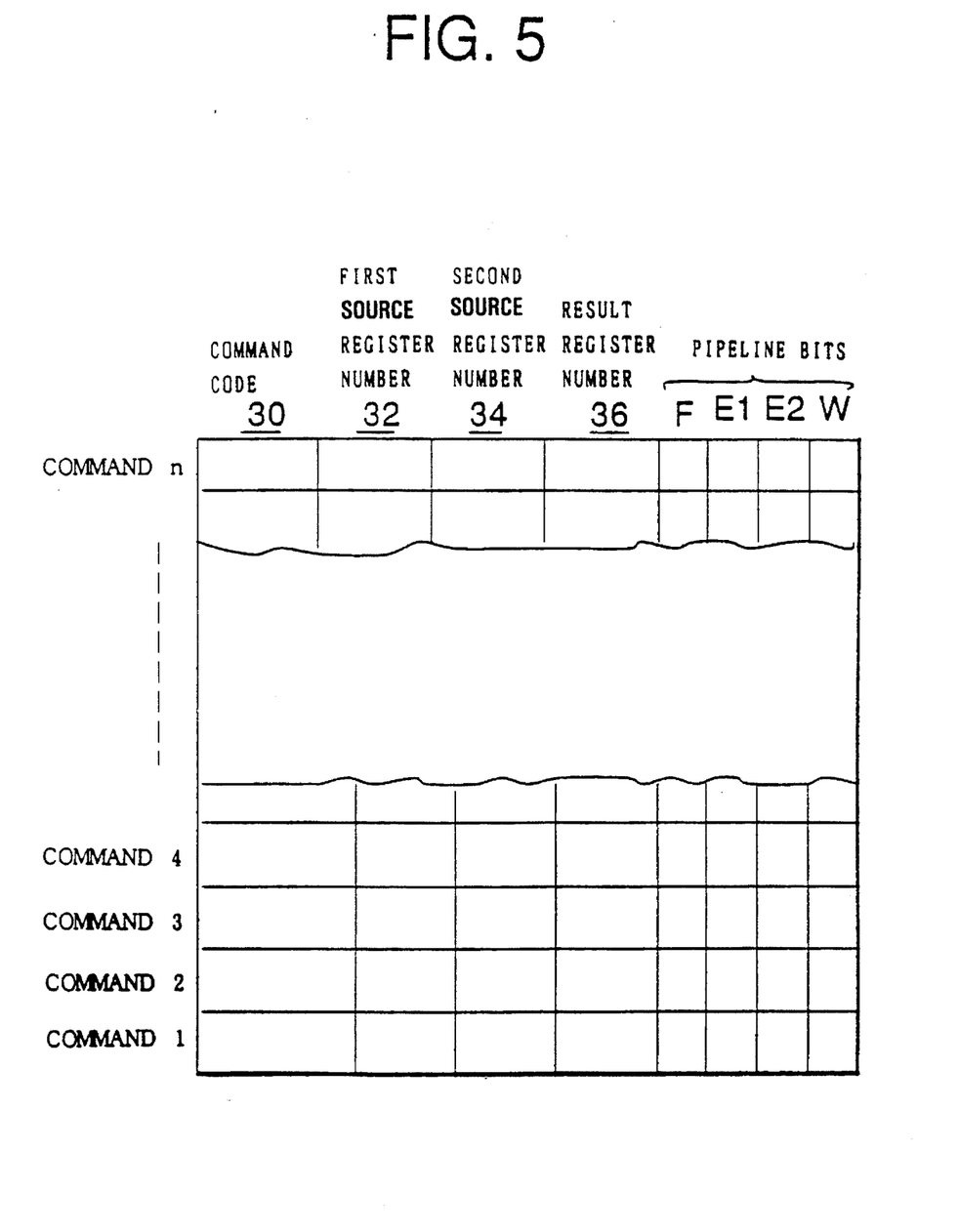
FIG. 5 is an explanatory diagram of a command queue which is used in the present invention.

The control unit 28 comprises: the command queue 14 as command queueing means; the controller 25; and the asynchronous pipeline computing unit 18 as a pipelined asynchronous computing unit. The command queue 14 comprises the command code 30, the first source register number 32, the second source register number 34, and the result register number (destination register number) 36 for each of commands 1 to n shown as indices in FIG. 5. Further, pipeline bits are provided as a status area 20. In the asynchronous pipeline computing unit 18 in FIG. 4, since the pipeline comprises four stages which include a fetching stage F, a first executing stage $E_1$, a second executing stage $E_2$, and a writing stage W, storage areas of four pipeline bits corresponding to the stages F, $E_1$, $E_2$, and W are provided as pipeline bits of each command held in the command queue 14.

Referring again to FIG. 4, the controller 25 is provided in the asynchronous computation control unit 28. Various functions such as command selector 16, status monitor 22, and queue verifier 24 are provided for the controller 25. The command selector 16 fetches the command which can be executed from the commands held as a queue in the command queue 14 and supplies the command to the asynchronous pipeline computing unit 18. In this instance, the command selector 16 sends the first source register number 32, second source register number 34, and result register number 36 of the command fetched from the command queue 14 to the general purpose register group 38 of the CPU 26 through a register address bus 44 and supplies the source data stored in the corresponding source register to the asynchronous pipeline computing unit 18 through a source data bus 46. The result of the execution by the computing unit 18 is written through a write data bus 48 into a destination register that is designated by the result register number designated via the register address bus 44. Further, the status monitor 22 and the queue verifier 24 are provided for the controller 25 in correspondence to the pipeline bits (F, $E_1$, $E_2$, W) provided in the status area 20 of the command queue 14. The status monitor 22 monitors a progressing situation of the command supplied to the asynchronous pipeline computing unit 18 and rewrites the pipeline bits provided in the status area 20 of the command queue 14 each time the command advances to the fetching stage, first executing stage, second executing stage, and writing stage.

Figure 6:
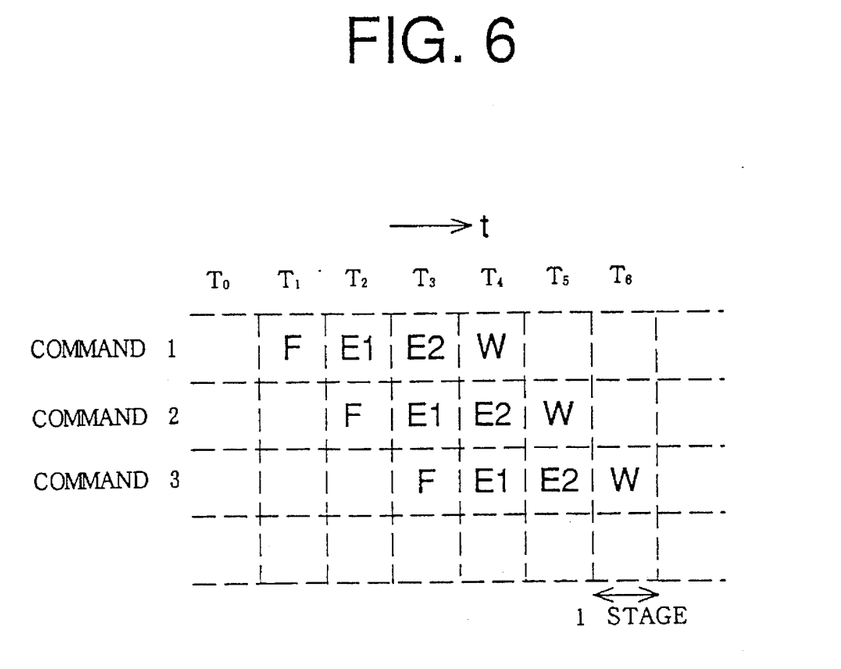
FIG. 6 is a time chart showing a state of the parallel execution of commands in an asynchronous pipeline computing unit.

FIG. 6 is a time chart showing an executing state of the commands in the asynchronous pipeline computing unit 18. First, a command 1 is supplied to the first fetching stage in a $T_1$ cycle. A process based on the source data in the first source register is executed at the first executing stage $E_1$ in the next $T_2$ cycle. In the $T_2$ cycle, the next command 2 is supplied to the fetching stage F. In the next $T_3$ cycle, the command 1 advances to the second executing stage $E_2$ and a process based on the source data from the second source register is executed. At the same time, the command 2 progresses to the first executing stage $E_1$ and a process based on the source data in the first source register is executed and a command 3 is further newly supplied to the fetching stage F. In the $T_4$ cycle, the command 1 progresses to the writing stage W and the result of the execution is written into the destination register. The command 2 advances to the second executing stage $E_2$ and the command 3 further progresses to the first executing stage $E_1$. In the $T_5$ cycle, the command 2 progresses to the writing stage W and the command 3 advances to the second executing stage $E_2$. In the $T_6$ cycle, the command 3 progresses to the writing stage W.

The parallel executing stages of a plurality of commands in the asynchronous pipeline computing unit 18 as shown in FIG. 6 are monitored by the status monitor 22. As for the pipeline bits (F, $E_1$, $E_2$, W) of each command in the status area 20 of the command queue 14, the pipeline bit indicative of the stage at which the corresponding command exists is set to bit 1 and the other pipeline bits are reset to 0. The queue verifier 24 provided in the controller 25 checks the contents in the status area 20 of a plurality of commands held in the command queue 14 for every cycle of the asynchronous pipeline computing unit 18, thereby verifying whether the order and operation of the asynchronous pipeline computing unit 18 according to the commands held in the command queue 14 are correct or not.

Figure 7:
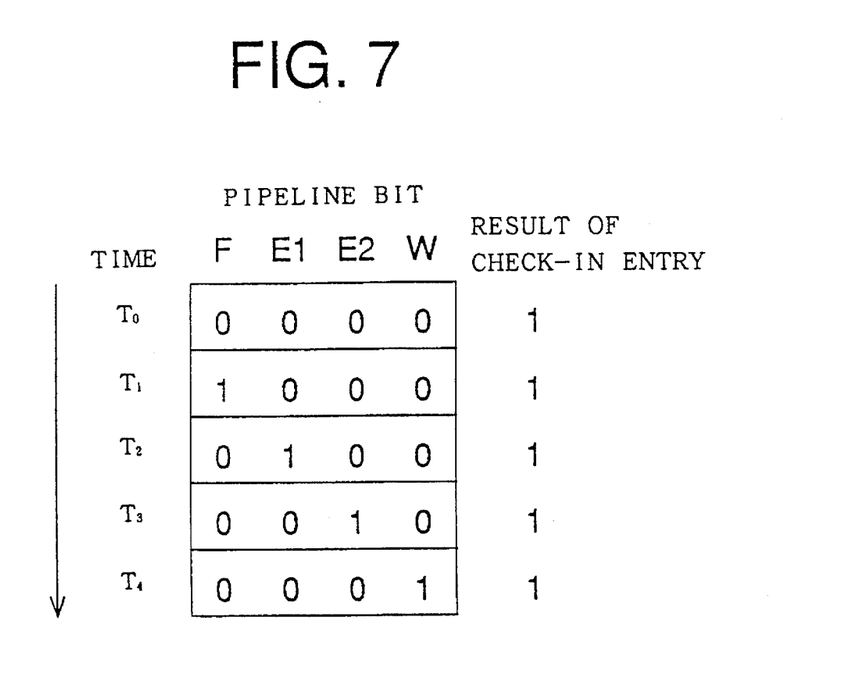
FIG. 7 is an explanatory diagram showing a checking state of pipeline bits in the case where the commands were correctly executed.

FIG. 7 shows cycle changes in pipeline bits in the status area 20 of the command queue 14 in the case where a certain command had been supplied to the computing unit 18 and was correctly executed. Such cycle changes correspond to, for example, the command execution for an interval from $T_0$ cycle to the $T_4$ cycle of the command 1 shown in FIG. 6. The first $T_0$ cycle indicates the pipeline bits before the command is supplied. When the commands are correctly executed as mentioned above, only one of the pipeline bits (F, $E_1$, $E_2$, W) in each of the $T_1$ to $T_4$ cycles is equal to 1. That is, this means that a plurality of pipeline stages don't exist in the entry of the same command. Before the command is supplied, all of the pipeline bits are set to 0.

The queue verifier 24 of the present invention executes an NC1 check for every command with regard to the pipeline bits of the command queue 14. The NC1 check denotes that in the case where all of the four pipeline bits are equal to 0 or one of them is set to 1, a check output signal of 1 is generated, thereby indicating that the operation is correctly being executed by the check output 1. On the other hand, when two or more bits among the four pipeline bits are equal to 1, a check output signal of 0 is generated, thereby indicating that the operation is abnormally executed.

Figure 8:
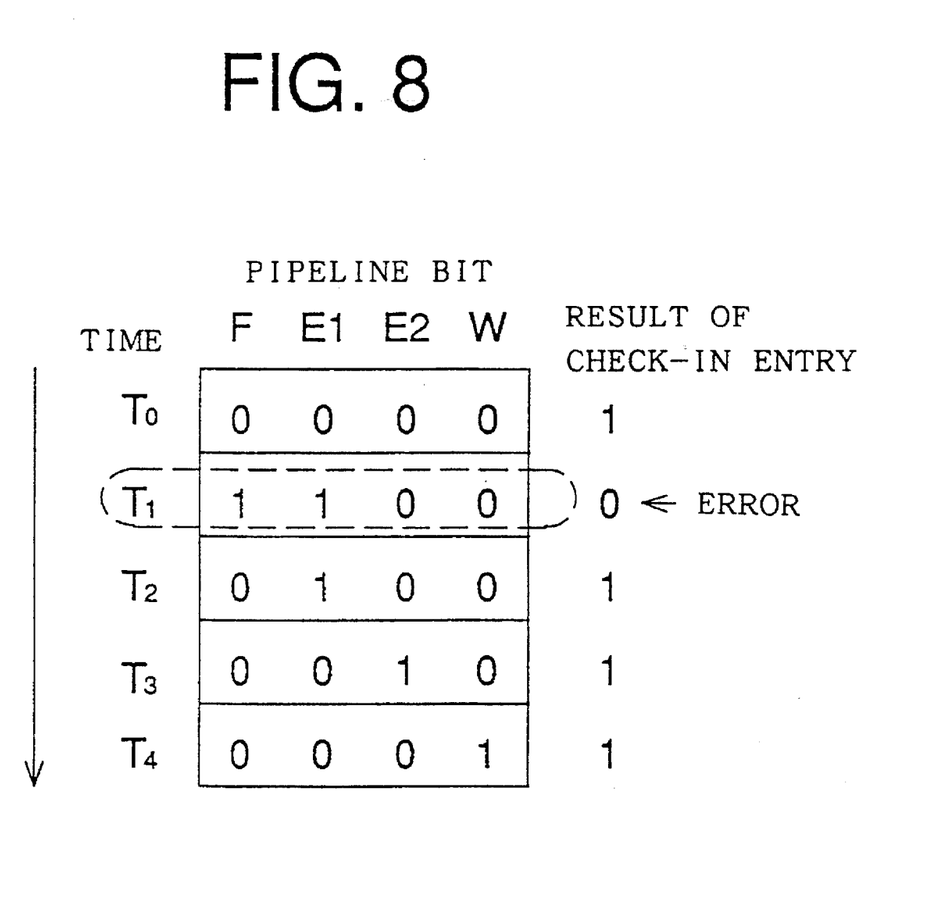
FIG. 8 is an explanatory diagram showing a checking state of pipeline bits in the case where an abnormality occurred during the execution of commands.
Figure 9:
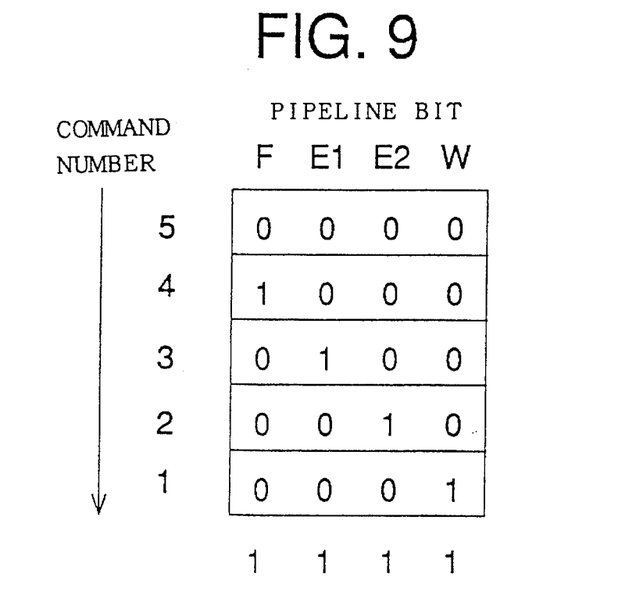
FIG. 9 is an explanatory diagram showing a checking state of pipeline bits among commands in the normal operation.

FIG. 8 shows an abnormality of the operation such that the pipeline bits F and $E_1$ are equal to 1 and two commands exist in the same entry in the $T_1$ cycle in FIG. 7. In this case, the result of the NC1 check in the $T_1$ cycle is equal to 0 and the occurrence of an abnormality can be detected. FIG. 9 shows a verification of the pipeline bits among a plurality of commands in the queue verifier 24 and shows the case where all of the commands are correctly being executed. In such a case, for example, five commands of the command Nos. 1 to 5 are held in the command queue 14 and have the bit contents shown in the pipeline bits (F, $E_1$, $E_2$, W) and the normal operations are being executed. Therefore, only one bit exists in the same stage among the commands, namely, in the bit train when it is seen in the vertical direction. Since a plurality of commands does not exist in the same stage with respect to the portions among a plurality of commands, the queue verifier 24 guarantees the correct order and operation. In this case as well, the NC1 check is executed on the same pipeline bit among a plurality of commands and the operation is correctly executed, so that all of the results of the verification among the commands are set to 1.

Figure 10:
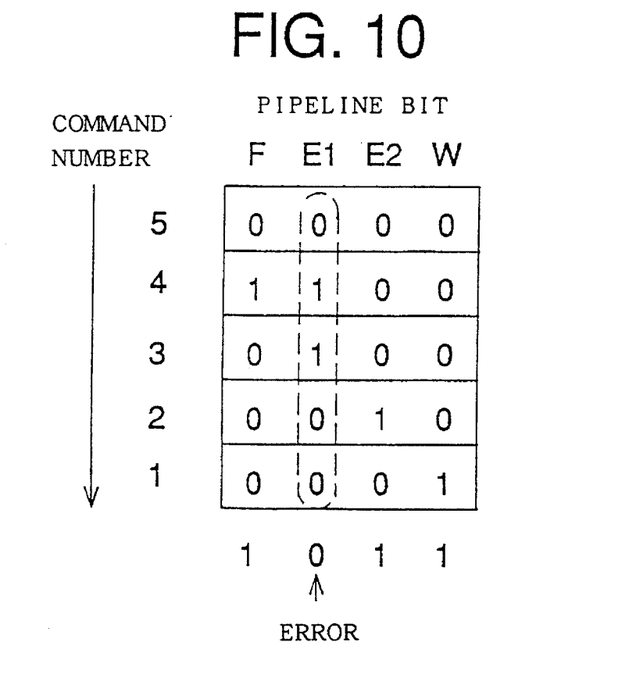
FIG. 10 is an explanatory diagram showing a checking state of the pipeline bits among the commands when an abnormal operation has occurred.

FIG. 10 shows the case where an abnormality occurred in the NC check among the commands in FIG. 9. The bit 1 is set in the command Nos. 3 and 4 with respect to the pipeline bit $E_1$ and the result of the verification is set to 0, so that the occurrence of an abnormality of the operation can be recognized. In the queue verifier 24 in the present invention, either the NC1 check of every command shown in FIGS. 7 or 8 and the NC1 check among the commands shown in FIGS. 9 and 10 can be executed. In order to discriminate that the abnormality has occurred with respect to the execution of which command, it is desirable to simultaneously execute the NC1 check of every command and the NC1 check among the commands. For example, when an abnormality as shown in FIG. 10 occurs, it is possible to recognize that although the order and operation in the execution of the commands of the command No. 3 are correct, it is possible to recognize that the operation and order of the next command number 4 are wrong. Such an abnormality can be recovered by the retry of the command 4.

Figure 11:
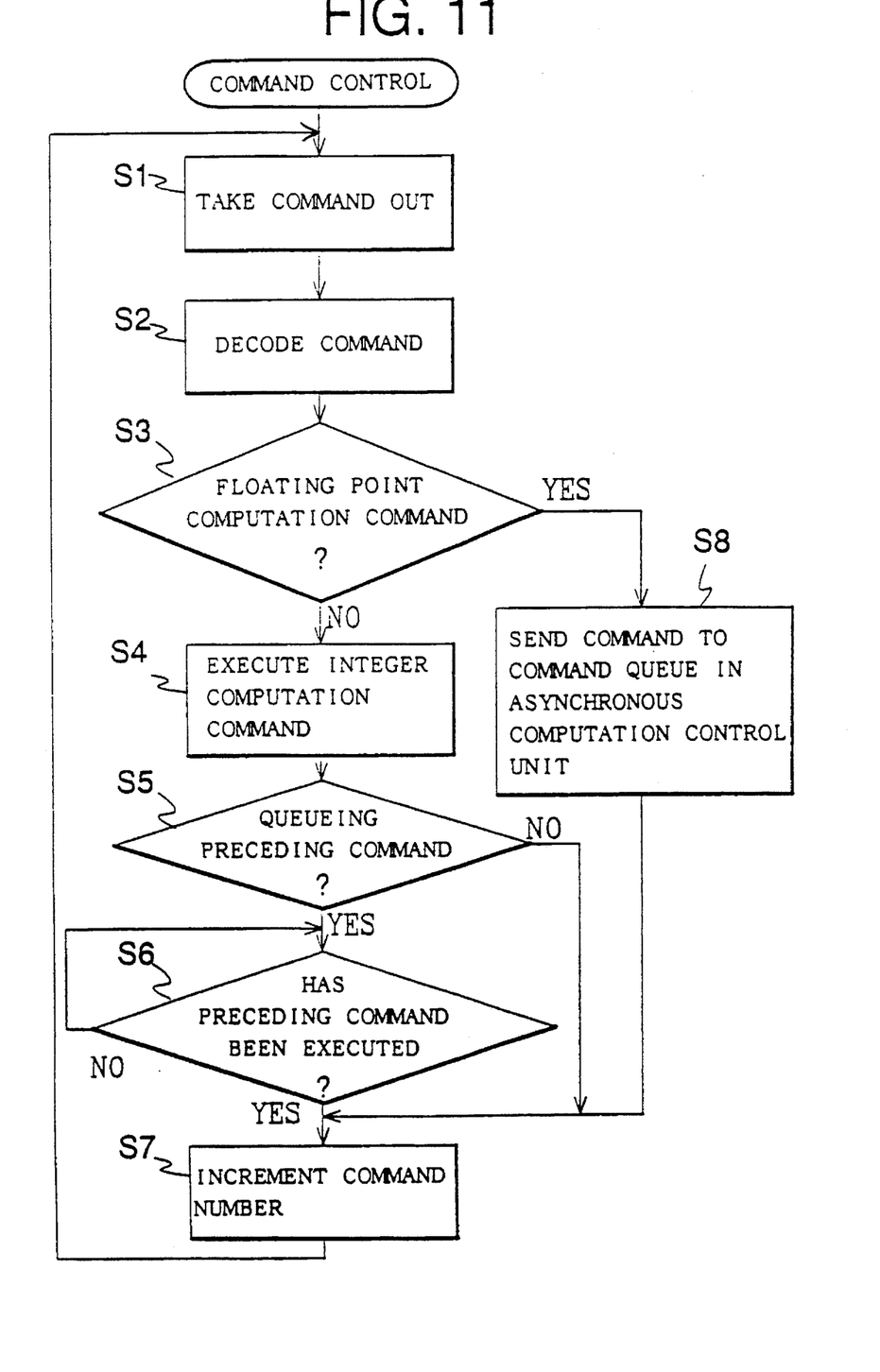
FIG. 11 is an explanatory diagram showing a command control of a central processing unit in FIG. 4.

FIG. 11 is a flowchart showing control processes by the command control 10 of the CPU 26 shown in FIG. 4. First, in step S1, the command control 10 fetches commands in accordance with a predetermined order. In step S2, the command control decodes the command. In step S3, a check is made to see if the command is a floating point computation command or not from the result of the decoding of the command. When the command is an integer computation command, it is sent to the integer computing unit 12, by which the integer computation command is executed in one cycle in step S4. When the command is the floating point computation command, step S8 follows and the floating point computation command is sent to the command queue 14 in the asynchronous computation control unit 28. When the integer computation command is executed in step S4, a check is made in step S5 to see if the apparatus waits for the end of the queueing preceding command sent to the asynchronous computation control unit 28 or not. If YES, step S6 follows and the apparatus waits for a notification indicative of the end of the execution of the preceding command sent to the control unit 28. If NO in step S5 or when the notification of the end of the execution of the preceding command is received in step S6, the processing routine advances to step S7 and the command number is increased by +1. The processing routine is again returned to step S1 and the next command is fetched and processes similar to those mentioned above are also executed hereinafter.

Figure 12:
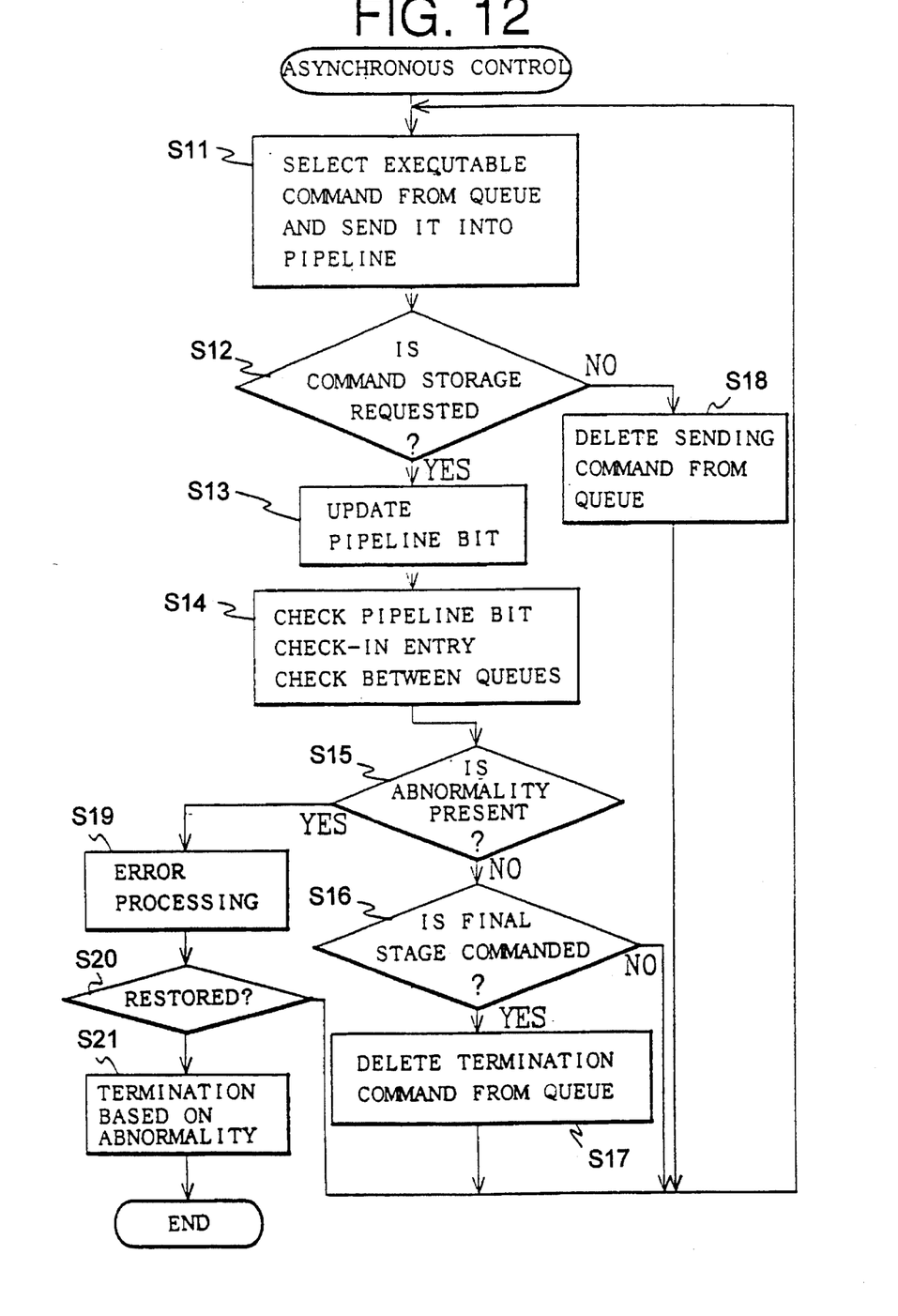
FIG. 12 is a flowchart showing an asynchronous control of an asynchronous computation control unit in FIG. 4.

FIG. 12 is a flowchart showing asynchronous controls by the controller 25 provided in the asynchronous computation control unit 28 shown in FIG. 4. First, in step S11, the command which can be executed by the command selector 16 provided in the controller 25 is selected from the commands in the command queue 14 and supplied to the asynchronous pipeline computing unit 18. In step S12, a check is made to see if there is a preserving request or not with respect to the supplied command. If there is no preserving request, the command which has already been supplied to the computing unit 18 is deleted from the command queue 14 in step S18. Since the floating point computation command as a target of the verification in the present invention has the preserving request, it is not deleted from the command queue 14 and the processing routine advances to step S13. A bit updating process to set the pipeline bit corresponding to the pipeline stage in which the command exists to 1 each time the command cycle is executed by the asynchronous pipeline computing unit 18 is executed for the status area 20 of the command queue 14. In step S14, each time the bit updating process is finished, the pipeline bit stored in the status area 20 of the command queue 14 is discriminated. In this discrimination, both the NC1 check in the entry of every command and the NC1 check between commands are performed. In step S15, the presence or absence of an abnormality is judged from the result of the NC1 checks. When all of the results of the NC1 checks are equal to 1, it is determined that the operation was correctly executed, so that step S6 follows. In step S16, a check is made to see if the command which has finished the final stage exists or not. If YES, step S17 follows and an execution end command is deleted from the command queue.

When bit 0 is obtained from the result of the NC1 checks about the pipeline bits in step S15, it is determined that there is an abnormality, so that step S19 follows and an error process is executed. For example, a retry process for again fetching the command in which an abnormality has occurred from the command queue 14 and for supplying to the asynchronous pipeline computing unit 18 is executed. By executing such a retry process, when the normal operation is judged from the NC1 checks about the pipeline bits in step S19, it is decided that the operation has been recovered in step S20. The processing routine is again returned to the process in step S11. On the other hand, when the occurrence of the abnormality is based on a cause of the hardware such as disconnection of a wire, failure, or the like, the abnormality will not be recovered even by executing the retry process. Therefore, the processing routine advances to step S21 and a termination is made as an abnormality. In such an abnormality termination, for instance, in the case where the data processing apparatus of the present invention is used in the scalar units of processor elements of a super computer with a parallel machine structure or the like, a process such as to disconnect the processor element having the scalar unit which has caused an abnormality from the target for the parallel processes or the like is executed.

According to the present invention as mentioned above, in the case where an abnormality occurred due to the occurrence of a disturbance of the control in the execution of the commands based on the command queue because of a defective LSI, failure, disconnection of wire, defective logic operation, or the like, since the pipeline bits provided for the command queue are always discriminated, the operation abnormality can be recognized on the basis of the result of the discrimination. A countermeasure such as abnormality termination or the like, accordingly, can be made. The correct order and operation of the execution of the commands using the command queue can be always guaranteed. The reliability of the asynchronous computation control unit can be remarkably improved.

Although the above embodiment has been described with respect to the data processing apparatus which is used as a scalar unit in the processor element of a super computer as an example, the present invention is not limited to such an example but can be also directly used as a central processing unit of a proper computer.

Further, the present invention is not limited to the above embodiment but many modifications and variations are possible without departing from the spirit and scope of the claims of the invention. The invention is also not limited by the numerical values shown in the embodiment.

What is claimed is:

1. A method of verifying an order and operation of a data processing apparatus, the method comprising:

a command transfer step of sequentially decoding commands and distinguishing the commands into synchronous computation commands and asynchronous computation commands and separately transferring those commands to different execution destinations;

a synchronous computing step of executing the synchronous computation commands;

command execution waiting step of holding the asynchronous computation commands and waiting for execution of the asynchronous computation commands;

a command selecting step of selecting executable commands from the asynchronous computation commands held by said command execution waiting step and holding one of the selected executable commands until an end of execution of the selected one executable command;

a pipelined asynchronous computing step of dividing each of the selected executable commands into a plurality of pipeline stages and separately executing the selected executable commands;

a status monitoring step of assuring a status bit at each pipeline stage for each asynchronous computation command held by said command execution waiting step and setting a bit flag, indicative of the execution of a corresponding selected executable command in said asynchronous computing step, in a corresponding status area; and a verifying step of checking said status bits for each asynchronous computation command held by said command execution waiting step, verifying that a plurality of said pipeline stages does not exist in the status area of the same asynchronous computation command, and at the same time, checking said status bits among each asynchronous computation command held by said command execution waiting step and verifying that a plurality of the same pipeline stages does not exist among the asynchronous computation commands.

2. The method according to claim 1, wherein said verifying step, in a case where a plurality of the pipeline bits exists in the status area of one of the asynchronous computation commands, determines that an abnormality in computation control of the data processing apparatus has occurred.

3. The method according to claim 1, wherein said verifying step, in a case where a plurality of the pipeline bits exists in the same stage of a plurality of the asynchronous computation commands, determines that an abnormality in computation control of the data processing apparatus has occurred.

4. The method according to claim 1, wherein if one of the decoded commands is determined to be a floating point command in said command transfer step, said command execution waiting step holds and waits for the execution of said floating pointing command.

5. The method according to claim 1, wherein in said command selecting step, in a case where one of the selected executable commands is a floating point command, said floating point command is held until an end of the execution of said floating point command.

6. An apparatus for verifying an order and operation of a data processor, the apparatus comprising:

command control means for sequentially decoding commands and distinguishing said commands into synchronous computation commands and asynchronous computation commands;

synchronous computing means for executing the synchronous computation commands sent from said command control means;

command execution waiting means for holding the asynchronous computation commands sent from the command control means and waiting for execution of the asynchronous computation commands;

command selecting means for selecting executable commands from said command execution waiting means and allowing one of the selected executable commands to be held in said command execution waiting means until an end of the execution of the one selected executable command;

pipelined asynchronous computation means for dividing each of the selected executable commands selected by said command selecting means into a plurality of pipeline stages and executing the selected executable commands in parallel;

status monitoring means for assuring a status bit at each pipeline stage for each asynchronous computation command held by said command execution waiting means and setting a bit flag, indicative of the execution of a corresponding selected executable command in said pipelined asynchronous computation means, in a corresponding status area; and verifying means for checking said status bit for each asynchronous computation command held by said command execution waiting means, verifying that a plurality of said pipeline stages does not exist in the status area of the same asynchronous computation command, and at the same time, checking said status bits among each asynchronous computation command held by said command execution waiting means and verifying that a plurality of the same pipeline stages does not exist among the asynchronous computation commands.

7. The apparatus according to claim 6, wherein in a case where a plurality of the pipeline bits exists in the status area of one of the asynchronous computation commands, said verifying means determines that an abnormality in computation control of the data processor has occurred.

8. The apparatus according to claims 6, wherein in a case where a plurality of the pipeline bits exists in the same stage of a plurality of the asynchronous computation commands, said verifying means determines that an abnormality in computation control of the data processor has occurred.

9. The apparatus according to claim 6, wherein in a case where said command control means decodes a floating point command, said command control means transfers said floating point command to said command execution waiting means.

10. The apparatus according to claim 6, wherein in a case where said command selecting means selects a floating point command, said floating point command is held in said command execution waiting means until an end of the execution of said floating point command by said asynchronous computing means.

11. The apparatus according to claim 6, further comprising:

a central processing unit comprising
  said command control means, and
  said synchronous computing means; and an asynchronous computation control unit comprising
  said command execution waiting means,
  said command selecting means,
  said asynchronous computing means,
  said status monitoring means, and
  said verifying means.

12. An apparatus for verifying an order and operation of a data processor, the apparatus comprising:

command execution waiting means for holding commands and waiting for execution of each of the commands;

command selecting means for selecting an executable command from said command execution waiting means and for allowing said selected command to be held in said command execution waiting means until an end of the execution of said selected command;

pipelined asynchronous computing means for dividing the commands selected by said selecting means into a plurality of pipeline stages and executing the selected commands in parallel;

status monitoring means for assuring a status bit at each pipeline stage for each command held by said command execution waiting means and setting a bit flag, indicative of the execution of a corresponding selected command in said pipelined asynchronous computing means, in a corresponding status area; and verifying means for checking said status bit for each command held by said command execution waiting means, verifying that a plurality of said pipeline stages does not exist in the status area of the same command, and at the same time, checking said status bits among each command held by said command execution waiting means and verifying that a plurality of the same pipeline stages does not exist among the commands.

13. The apparatus according to claim 12, wherein in a case where a plurality of the pipeline bits exists in the status area of one one of the commands, said verifying means determines that an abnormality in computation control of the data processor has occurred.

14. The apparatus according to claim 12, wherein in a case where a plurality of the pipeline bits exists at the same pipeline stage of a plurality of the commands, said verifying means determines that an abnormality in computation control of the data processor has occurred.

15. The apparatus according to claim 12, wherein in a case where said command selecting means selects a floating point command, said command execution waiting means holds said floating point command until an end of the execution of the floating point command by said asynchronous computing means.

16. The apparatus according to claim 12, further comprising an asynchronous computation control unit comprising said command execution waiting means;
 said asynchronous computing means;
 said status monitoring means; and
 said verifying means.

* * * * *

UNITED STATES PATENT AND TRADEMARK OFFICE
CERTIFICATE OF CORRECTION

PATENT NO. : 5,530,815
DATED : June 25, 1996
INVENTOR(S) : Hideaki NABEKURA, et al.

It is certified that error appears in the above-indentified patent and that said Letters Patent is hereby corrected as shown below:

Column 4, line 45, after "as", insert --a--.

Signed and Sealed this

Twenty-sixth Day of November 1996

Attest:

BRUCE LEHMAN

*Attesting Officer*　　　　*Commissioner of Patents and Trademarks*